March 1, 1966     H. V. HENDERSON     3,237,572
DRIVES FOR OVERHEAD HAULAGE VEHICLES Filed July 6, 1965     2 Sheets-Sheet 1

FIG. I

INVENTOR
HERBERT VICTOR HENDERSON
By Shoemaker and Mattare
ATTYS.

March 1, 1966 H. V. HENDERSON 3,237,572
DRIVES FOR OVERHEAD HAULAGE VEHICLES
Filed July 6, 1965 2 Sheets-Sheet 2

INVENTOR
HERBERT VICTOR HENDERSON
By Shoemaker and Mattare
Attys.

United States Patent Office 3,237,572
Patented Mar. 1, 1966

3,237,572
DRIVES FOR OVERHEAD HAULAGE VEHICLES
Herbert V. Henderson, Germiston, Transvaal, Republic of South Africa, assignor to Anglo-Transvaal Consolidated Investment Company Limited, Johannesburg, Transvaal, Republic of South Africa
Filed July 6, 1965, Ser. No. 469,540
Claims priority, application Republic of South Africa, July 10, 1964, 64/3,268
6 Claims. (Cl. 105—153)

This invention relates to drives for overhead haulage vehicles and more particularly to locomotives coupled to propel one or more carriages or tubs with the train suspended from an overhead track.

It will be appeciated that it is desirable to drive locomotives such as those above referred to with sufficient adhesion between the driving wheels and rails to propel the load at a given time and under the particular existing circumstances without slippage between drive wheels and rails while at the same time not applying unnecessarily large pressures to the drive wheels.

The object of the present invention is to provide a drive arrangement for such vehicles wherein the pressure applied by the drive wheels to the rails will vary automatically with the load to be moved.

According to this invention there is provided a locomotive adapted to be suspended from an overhead track said locomotive comprising a rigid frame, track engaging wheels on said frame positioned to contact at opposite sides of a track, a movable wheel support for at least one of said wheels mounted to allow limited movement of such wheel with respect to the frame in a direction substantially vertical to the length of the frame and radial to such wheel, a shaped draw-bar engaging the movable wheel support and longitudinally movable relative to the frame, such shape causing displacement of the movable wheel relative to the frame on longitudinal movement of the draw-bar and a drive for at least one of the wheels.

The invention also provides for the draw-bar to move in either longitudinal direction to displace the drive wheel.

A preferred embodiment of this invention will be described with reference to the accompanying drawings in which.

Figure 1:
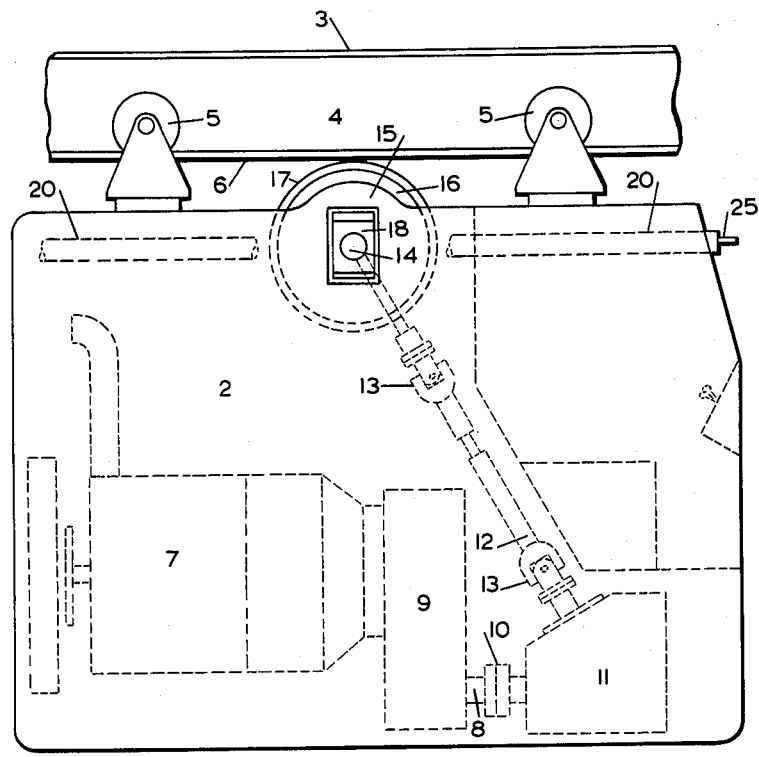
FIG. 1 is a general diagrammatic view of a locomotive.

It will be appreciated that the monorail locomotive illustrated in FIG. 1 is only one form of locomotive suitable for use with the present invention. Other constructions may be used provided either the drive or running wheels and the draw-bar are supported by but movable relative to the locomotive frame in the manner set forth above.

Briefly then with regard to FIG. 1 a practical form of locomotive 1 comprises a rigid frame 2 suspended from a track 3 which may conveniently be in the form of an I beam 4. The frame 2 is supported from two pairs of running wheels 5 which wheels are rotatably mounted on axles located towards the ends of the frame which axles will preferably be secured to the frame 2 in any convenient manner in swivel mountings which ensures that no longitudinal or vertical displacement of these wheels 5 relative to the frame 2 can take place.

As shown the wheels 5 run on the upper surfaces of the lower flanges 6 of I beam 4.

The frame 2 also houses the prime mover for the locomotive which may be a diesel engine 7 illustrated by the dotted lines representation and the drive 8 from this engine is connected either directly or through a Fottinger type of fluid transmission or sometimes called a torque converter 9 by a coupling 10 to a suitable reduction gearing unit 11. The output from the unit 11 is connected by means of an extensible drive shaft 12 and universal joints 13 to the shaft 14 of a single drive wheel assembly 15.

The assembly 15 is mounted in the frame 2 so that drive wheel 16 engages the undersurface of flanges 6 of I beam 4. The wheel 16 is preferably provided with a resilient tyre 17 made of material which will promote frictional engagement between wheel 16 and flange 6.

The drive wheel 16 is located in a central position relative to the running wheels 5 and the axle therefor is supported in bearing blocks 18.

The locomotive frame 2 also embodies in operator's cab with the necessary controls for operation of the locomotive.

Spring means (not illustrated) may be incorporated in the assembly to ensure that a certain minimum pressure is applied to the wheel supports to ensure engagement between tyre 17 and the track surface.

The lowest position of the drive wheel 16 is made to afford sufficient adhesion to drive at least the locomotive on its own without any load such as a train of carriages or tubs.

Figure 2:
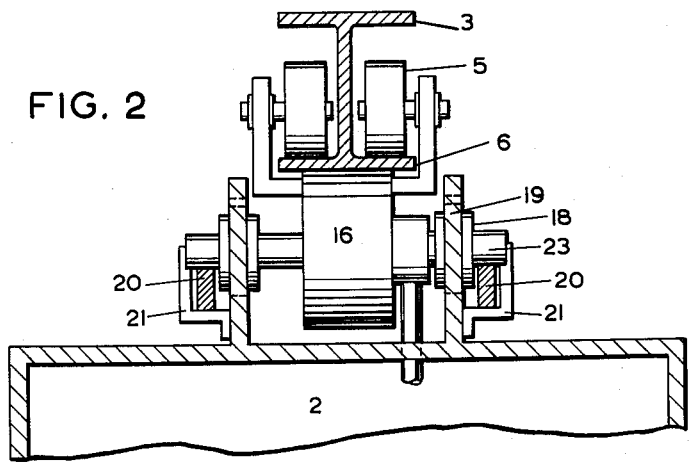
FIGS. 2 and 3 are diagrammatic representations illustrating the operation of this invention .
Figure 3:
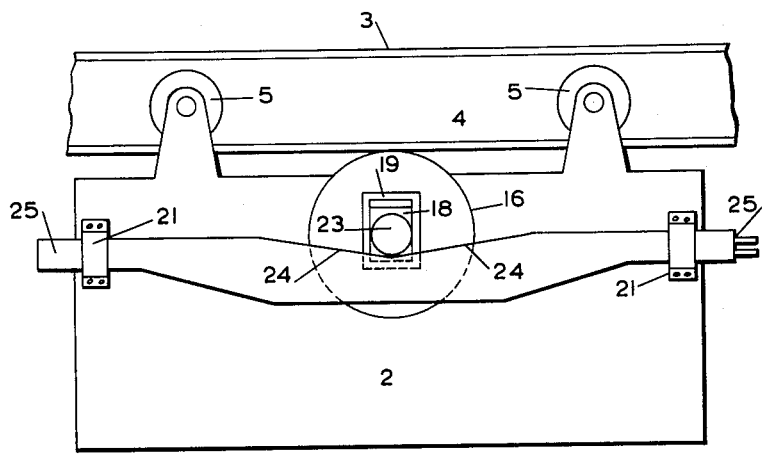

Referring now more particularly to diagrammatic drawings of FIGS. 2 and 3 it will be seen that the bearing blocks are located in robust guides 19 in a manner which allows a limited movement of the wheel 16 vertical to the surface of the track 3 engaged by wheel 16.

The load is adapted to be connected to the locomotive 1 through a draw-bar arrangement 20 which is mounted to move in guides 21 longitudinally of the locomotive frame 2 and with its upper surface 22, positioned to bear on underside of the movable drive wheel supports 23 which are formed as rigid robust outward extensions to the bearing blocks 18.

The surfaces 24 of the draw-bar assembly 20 which moves in contact with the wheel supports 23 are shaped as two oppositely directed downwardly converging inclined ramps so that surfaces 24 have a shallow V-shape profile. When no load is coupled to the draw-bar assembly the wheel supports 23 will be accommodated at the apices of the V-shapes.

It will be noted that the draw-bar assembly is bifurcated along its central portions so that a surface 24 is provided for each wheel support 23 while providing single end portions 25 for connection to a train of tubs. If desired only one end of the draw-bar assembly 20 need be made suitable for connection to the tubs since in general only one end of the locomotive will be connected to the load.

With a load on the draw-bar assembly 20 either tractive or braking, and with the locomotive 1 moving in either direction it will be understood that this load will tend to cause the draw-bar to move longitudinally relative to the frame 2 in one or other direction.

This movement causes the wheel support to move up one or other inclined portion 24 of the draw-bar 20 and forces the drive wheel 16 in tighter engagement with the track 3.

Relatively sliding surfaces are of course made as free from friction as possible and the ratio of the force applied by the load to the wheel supports 23 will be dependent on the angle of the inclined surfaces 22 of the draw-bar assembly 20.

The position of the running and drive wheels relative to the track may be reversed if this is for any reason advantageous and also more than the above described number of running or drive wheels may be used.

What I claim as new and desire to secure by Letters Patent is:

1. A locomotive adapted to be suspended from an overhead track said locomotive comprising a rigid frame, track engaging wheels on said frame positioned to contact opposite sides of a track, a movable wheel support for at least one of said wheels mounted to allow limited movement of such wheel with respect to the frame in a direction substantially vertical to the length of the frame and radial to such wheel, a shaped draw-bar engaging the movable wheel support and longitudinally movable relative to the frame, such shape causing displacement of the movable wheel relative to the frame on longitudinal movement of the draw-bar and a drive for at least one of the wheels.

2. A locomotive as claimed in claim 1 in which the draw-bar is longitudinally movable in either direction relative to the frame and shaped to cause displacement of the movable wheel on movement in either direction.

3. A locomotive as claimed in claim 1 in which the shaped surface of the draw-bar is formed as a shallow V.

4. A locomotive adapted to be suspended from an overhead track, said locomotive comprising a rigid frame, track engaging wheels on said frame positioned to contact opposite sides of a track, movable wheel supports on either side of at least one of said wheels and mounted to allow limited movement of such wheel with respect to the frame in a direction substantially vertical to the length of the frame and radial to such wheel, a bifurcated draw-bar having shaped arms one engaging each of the movable wheel supports and longitudinally movable relative to the frame, the shaping of the arms causing displacement of the movable wheel relative to the frame on longitudinal movement of the draw-bar and a drive for at least one of the wheels.

5. A locomotive as claimed in claim 4 in which two pairs of free-running wheels are provided on the frame, one pair located towards each end thereof and a single movable wheel coupled to the drive and located between the running wheels.

6. A locomotive as claimed in claim 4 in which two pairs of free-running wheels are provided on the frame located to engage the upper surface of a track and with one pair towards each end of the frame and a single movable wheel located to engage the undersurface of the track between the running wheels and coupled to the drive.

References Cited by the Examiner
UNITED STATES PATENTS 2,063,471   12/1936   Stedefeld _____ 74—330

ARTHUR L. LA POINT, *Primary Examiner.*

B. FAUST, *Assistant Examiner.*